(12) United States Patent
Sadowski

(10) Patent No.: US 7,401,790 B2
(45) Date of Patent: Jul. 22, 2008

(54) METAL GASKET WITH RIGID SEAL

(75) Inventor: Michael S. Sadowski, Elmhurst, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 126 days.

(21) Appl. No.: 11/032,738

(22) Filed: Jan. 11, 2005

(65) Prior Publication Data

US 2006/0151960 A1    Jul. 13, 2006

(51) Int. Cl.
*F02F 11/00* (2006.01)

(52) U.S. Cl. .................... 277/592; 277/594; 277/595

(58) Field of Classification Search .......... 277/592–598
See application file for complete search history.

(56) References Cited

U.S. PATENT DOCUMENTS

| | | | | |
|---|---|---|---|---|
| 3,477,867 | A | * | 11/1969 | Hillier .................... 427/272 |
| 4,721,315 | A | * | 1/1988 | Ueta ....................... 277/593 |
| 4,759,556 | A | | 7/1988 | Udagawa ............. 277/235 B |
| 5,391,333 | A | | 2/1995 | Stecher et al. ........... 264/40.1 |
| 5,403,532 | A | | 4/1995 | Stecher et al. ............. 264/219 |
| 6,019,376 | A | | 2/2000 | Miyaoh .................... 277/593 |
| 6,062,572 | A | * | 5/2000 | Hasegawa et al. ......... 277/592 |
| 6,231,049 | B1 | | 5/2001 | Ridgway .................. 277/595 |
| 6,354,599 | B1 | | 3/2002 | Inamura ................... 277/591 |
| 6,422,572 | B1 | * | 7/2002 | Ueda et al. ............... 277/591 |
| 6,499,743 | B2 | | 12/2002 | Sadowski ................. 277/593 |
| 6,682,080 | B2 | * | 1/2004 | Miyaoh .................... 277/592 |
| 6,827,352 | B2 | * | 12/2004 | Ueta et al. ................ 277/593 |
| 7,017,918 | B2 | * | 3/2006 | Barclay et al. ............. 277/593 |
| 2001/0033059 | A1 | | 10/2001 | Forry et al. ............... 277/591 |
| 2003/0015845 | A1 | | 1/2003 | Miyaoh .................... 277/594 |
| 2003/0080514 | A1 | | 5/2003 | Barclay et al. ............. 277/598 |

FOREIGN PATENT DOCUMENTS

| DE | 4142600 | 7/1993 |
|---|---|---|
| EP | 0485693 | 5/1992 |

* cited by examiner

*Primary Examiner*—Vishal Patel
(74) *Attorney, Agent, or Firm*—Robert L. Stearns; Dickinson Wright PLLC

(57) ABSTRACT

A seal joint for sealing a fluid is particularly adapted for use in extreme pressure and/or temperature environments. The seal joint includes a first member having a first sealing surface and a first opening therein, and a second member having a second sealing surface and a second opening therein, such that the first opening and the second opening comprise mating openings, and together comprise a fluid passageway. The seal joint also includes a metal gasket sheet located between the first sealing surface and the second sealing surface which has an aperture through the sheet which corresponds to the mating openings. The seal joint also includes a rigid seal which surrounds the perimeter of the aperture and which is attached to the surface of the metal gasket sheet. The rigid seal has a thickness and a width which vary as a function of position along the length of the seal. The seal joint also includes a means for applying a sealing force to press the first member, metal gasket sheet and second member together to form the seal joint between them, such that the means for applying the sealing force causes elastic deformation of at least one of the first sealing surface or the second sealing surface by the rigid seal.

8 Claims, 7 Drawing Sheets

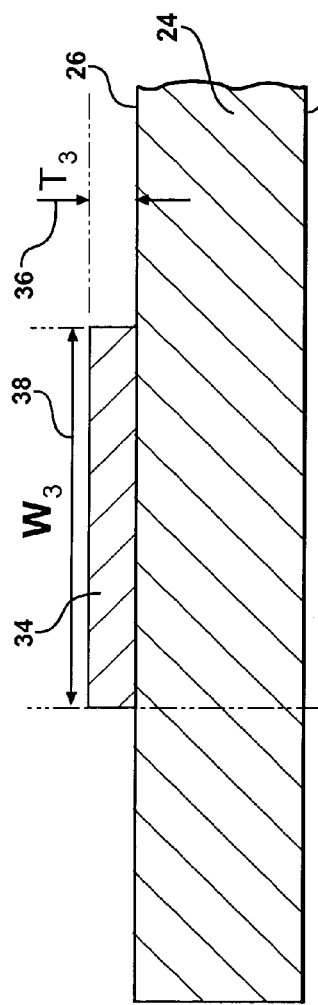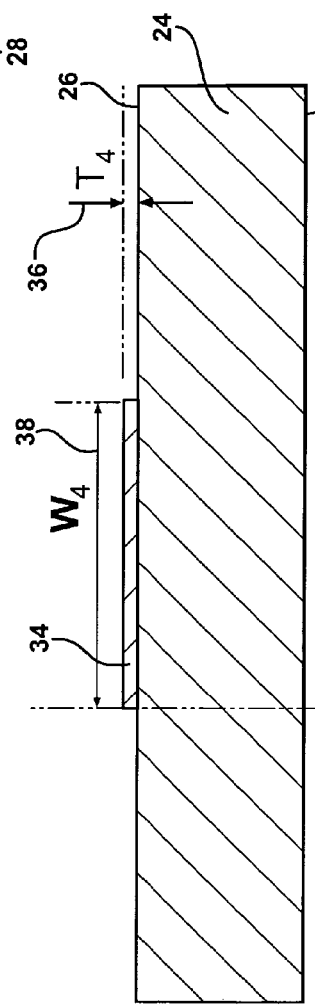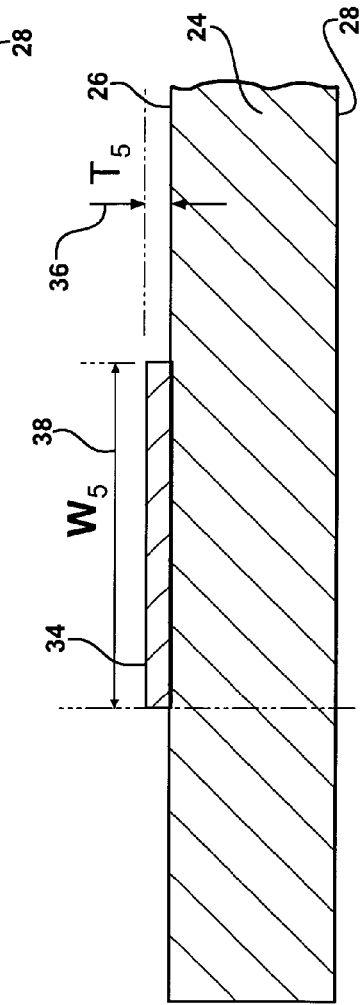

METAL GASKET WITH RIGID SEAL

BACKGROUND OF THE INVENTION

1. Technical Field

The present invention relates generally to metal gaskets. The invention relates more particularly to metal gaskets having a rigid seal. Most particularly, the invention relates to a metal gasket having a rigid seal that varies in thickness and width along its length.

2. Related Art

In sealing applications associated with extreme pressure and/or temperature environments, such as various sealing applications in internal combustion engines (i.e., head gaskets, exhaust manifold gaskets, turbocharger gaskets, etc.), multilayer metal gaskets with elastically deformable embossments have been utilized to provide the required fluid seals. Three common issues exist with multilayer metal gaskets, such as multilayer steel cylinder head gaskets, the fatigue resistance of the gaskets, load relaxation and joint distortion associated with the use of the gaskets. Multilayer metal gaskets are made from thin sheets of metal, such as steel. In many applications, such as cylinder head gasket applications, these multilayer metal gaskets are subjected to temperature and pressure extremes associated with the operation of the internal combustion engine and the environmental conditions under which it is utilized. Thus, as the engine is operated, the internal combustion processes subject the cylinder head gasket to repeated pressure-induced cyclic motion and stresses and extreme temperatures. Over the operating life of an engine, this cyclical motion and stresses at the extreme operating temperatures can cause fatigue within the metal gasket, particularly fatigue in the region of the embossments which are used to provide the sealing surfaces of the gasket. While a cylinder head gasket is used as an example, other applications of multilayer metal gaskets are also subject to cyclic pressures and temperatures associated with their operating environment, and are thus also subject to the fatigue processes described above.

In the case of multilayer metal gaskets used in cylinder head gasket applications, this motion, and associated load change, within the cylinder head gasket is known to play a significant role in cylinder bore distortion because the cylinder head gasket is the interface between the cylinder bore located within the engine block and the cylinder head. In operation, the cyclic motion described above also results in distortion of the cylinder bore in the region of the gasket. Cylinder bore distortion can cause high rates of wear on the piston rings or combustion gas blow-by within the head gasket.

One of the primary factors effecting fatigue is the fact that an embossment must be added to the cylinder head gasket to redistribute the available bolt load to produce a uniform sealing force along the length of the sealing feature of the cylinder head gasket. This embossment reduces the stiffness of the joint and exacerbates joint motion. As the gasket is subjected to cyclic temperatures and pressures, this can result in a tendency for fatigue failures at locations within the gasket where the magnitudes of the motions are highest. Further, the sealing forces associated with such gaskets are known to change as a function of time related to the cyclic motion and associated creep-induced stress relaxation processes.

One example of a multilayer metal gasket that is designed to address the issues described above is described in US 2003/0080514 A1 which is directed to combustion stopper seal having a variable thickness and width flange directly adjacent to the combustion cylinder opening and a method of making the stopper seal. The stopper seal is associated with a stopper layer of a multilayer metal gasket. The stopper seal is adapted to make the sealing pressure within the functional or sealing layers which contain the sealing embossments more uniform. However, the elastic nature of the embossments still permits undesirable motion within a seal joint which utilizes such a stopper layer, and also incorporates the associated inherent complexity of a multilayer metal gasket design.

Given the limitations associated with multilayer metal gaskets, it is desirable to develop new metal gasket designs and seal joint configurations which greatly reduce or eliminate cyclic motion within the seal joints due to the inherent characteristics of the gasket. It is also desirable to reduce the complexity of metal gaskets as compared to existing multilayer metal gasket configurations, by reducing the number of layers and associated elements. Further, it is also desirable to make the sealing force along the seals more uniform by controlling the sealing force along the length of the sealing surface of the gasket. Still further, it is desirable to develop gasket and seal configurations which have improved resistance to fatigue and relaxation of the sealing force as the seal joint is subjected to use and the application cyclic forces to the joint.

SUMMARY OF THE INVENTION

The present invention includes a seal joint which utilizes metal gasket sheet having a rigid seal which advantageously reduces or eliminates cyclic motion within the seal joints due to the inherent characteristics of the gasket and seal.

The present invention also advantageously reduces the complexity of the metal gasket as compared to existing multilayer metal gasket configurations, by reducing the number of layers and associated elements.

Further, the present invention also may be implemented so as to provide a seal having a sealing force which is uniform along the length of the seal by controlling the sealing force through the design of the thickness and width contour along the length of the sealing surface of the rigid seal.

Still further, the present invention also provides a seal joints having gaskets and rigid seals which have improved resistance to fatigue and relaxation of the sealing force as the seal joint is subjected to use and the application of cyclic forces to the joint.

The present invention is a seal joint between a first member having a first sealing surface and a first opening therein and a second member having a second sealing surface and a second opening therein, such that the first opening and the second opening comprise mating openings. The joint utilizes a metal gasket sheet located between the first sealing surface and the second sealing surface having an upper surface, a lower surface, and an aperture through the sheet which corresponds to the mating openings. The aperture has a perimeter. A rigid seal surrounds the perimeter of the aperture and is attached to at least one of the upper surface and lower surface. The rigid seal has a thickness and width which vary as a function of position along the length of the seal. The seal joint is sealed using a means for applying a sealing force to press together the first sealing surface, metal gasket sheet and the second sealing surface to form a seal joint between them. The action of the means for applying the sealing force causes elastic deformation of at least one of the first sealing surface or the second sealing surface by the rigid seal.

The rigid seal may be located directly adjacent to the perimeter of the aperture, or may be spaced from the aperture, or combinations of both. The rigid seal may be made from any suitably rigid material.

BRIEF DESCRIPTION OF THE DRAWINGS

These and other features and advantages of the present invention will become more readily appreciated when considered in connection with the following detailed description and appended drawings, wherein common elements have the same designations, and wherein:

FIG. 4 is a partial cross-sectional view of the gasket of FIG. 2 taken along line 4-4;

FIG. 5 is a partial cross-sectional view of the gasket of FIG. 2 taken along line 5-5;

FIG. 6 is a partial cross-sectional view of the gasket of FIG. 2 taken along line 6-6;

DETAILED DESCRIPTION OF THE PREFERRED EMBODIMENT

Figure 1:
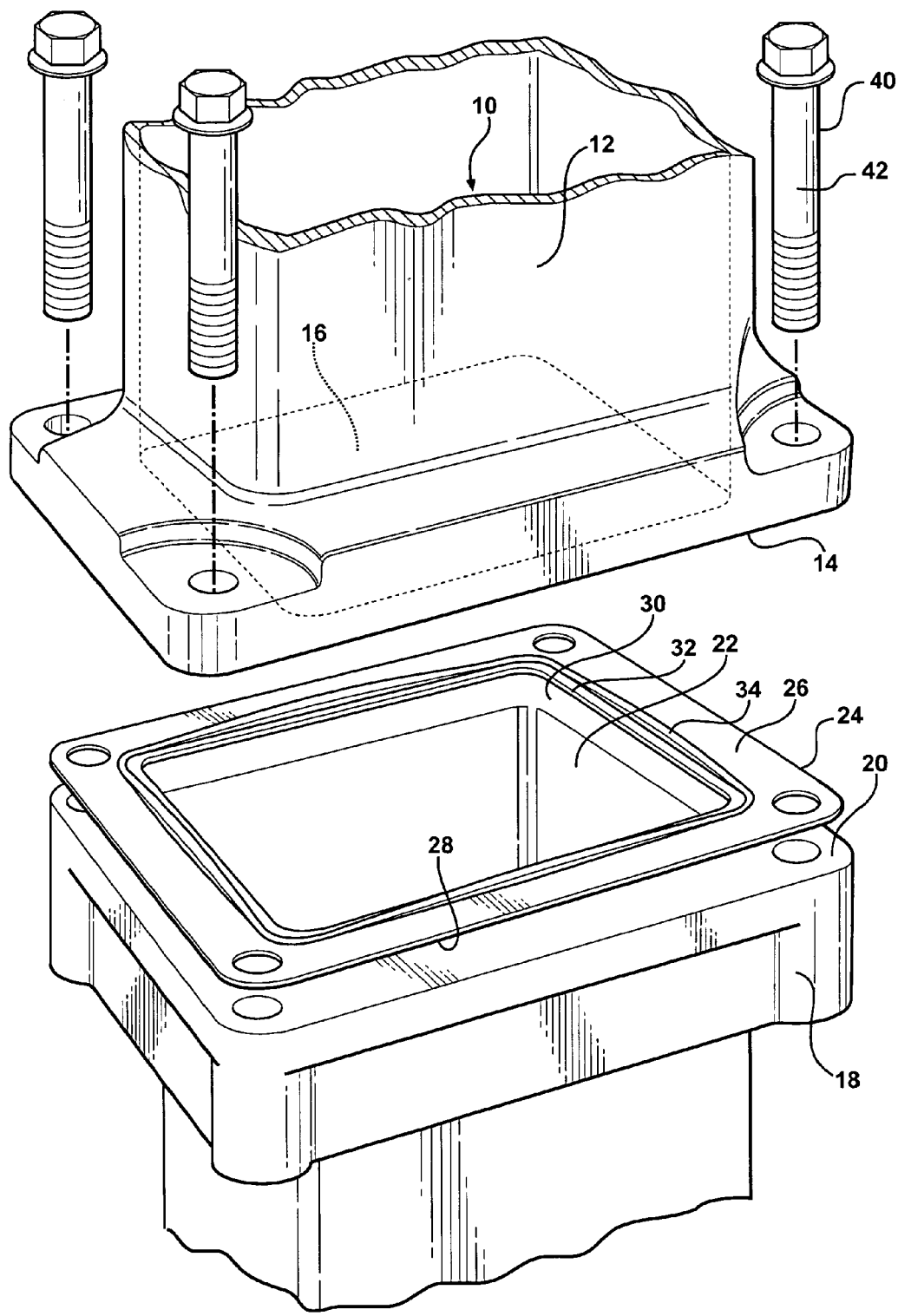
FIG. 1 is an exploded perspective view of a seal joint of the present invention.

FIG. 1 illustrates the elements of a seal joint 10 of the present invention. Seal joint 10 is particularly adapted for use in various seal joint applications, such as those within an internal combustion engine, such as the seal joint between the cylinder head and engine block, the seal joint between the cylinder head and exhaust manifold and, for turbocharged engines, the seal joint between the exhaust manifold and the turbocharger. While seal joint 10 is particularly useful for application in internal combustion engines, it will be recognized that such a seal joint may also be utilized in a number of other seal joint applications, particularly those which are subjected to extremes of temperature and pressure.

Referring to FIG. 1, seal joint 10 includes a first member 12 having a first sealing surface 14 and a first opening 16 therein. Seal joint 10 also includes a second member 18 having a second sealing surface 20 and a second opening 22 therein. As an example, the first member 12 may be the cylinder head and second member 18 may be the engine block. First opening 16 and second opening 22 may be openings associated with any of a number of first fluid passageways in first member 12 and second fluid passageways in second member 18. In another example, the first member 12 may be an exhaust manifold and second member 18 may be a cylinder head. In such an example, the first opening 16 may be to an associated exhaust passageway within the exhaust manifold and second opening 22 may be to an exhaust port in the cylinder head. It will be recognized that seal joint 10 is also applicable to any of a number of other seal joints within an internal combustion engine.

Figure 2:
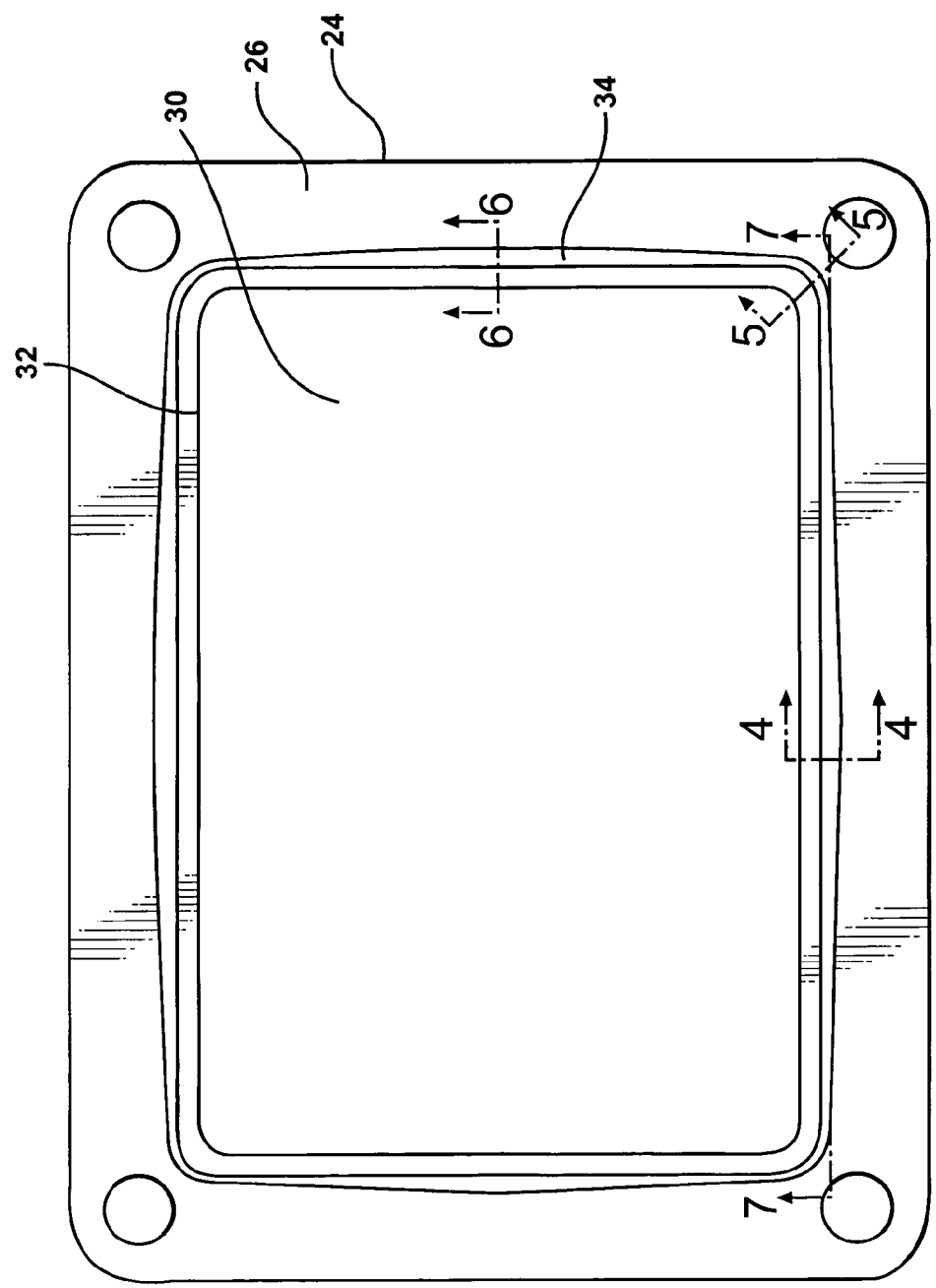
FIG. 2 is a schematic illustration of a gasket and rigid seal of the present invention.
Figure 3:
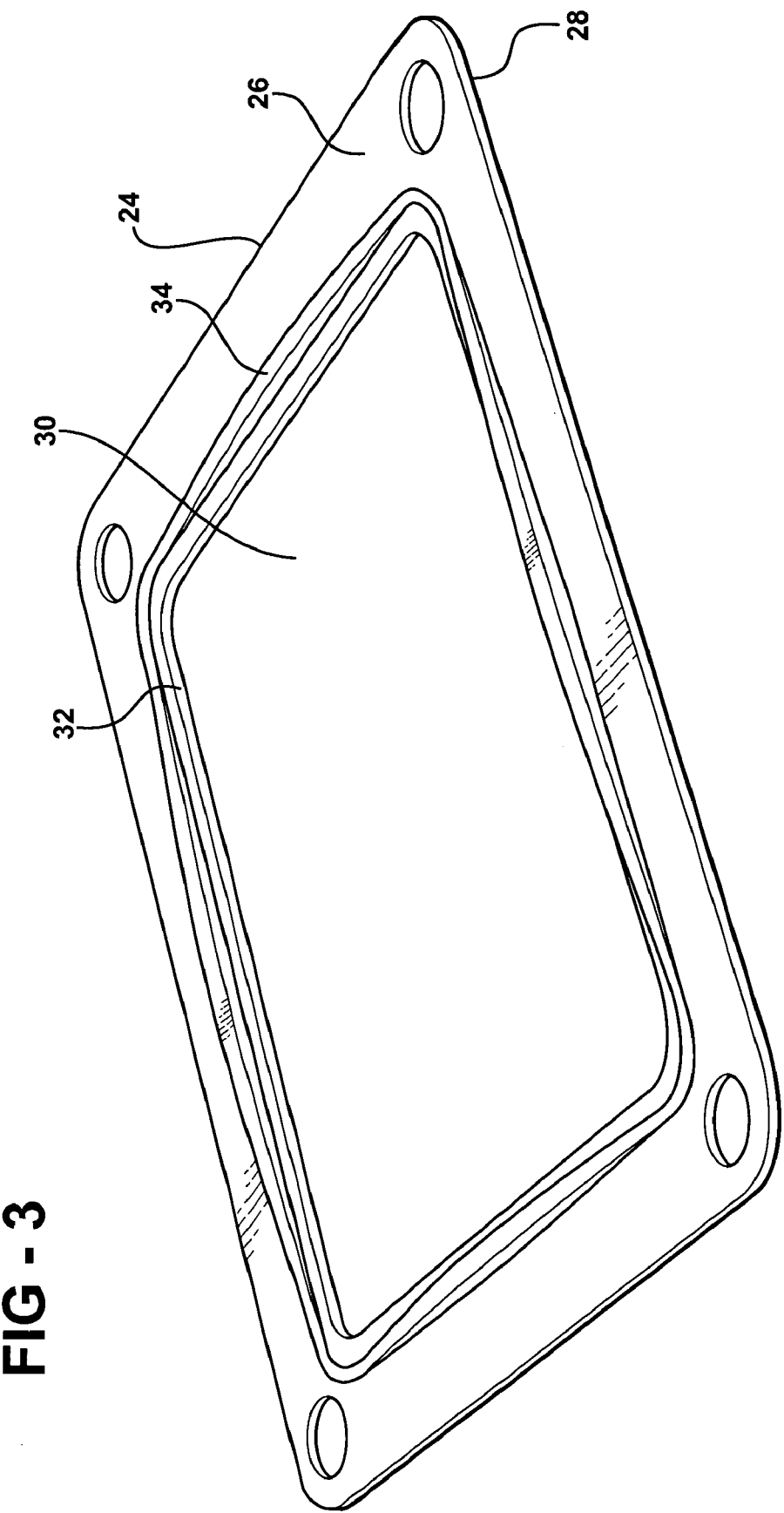
FIG. 3 is a front view of the gasket of FIG. 2.

Referring to FIGS. 1-6, seal joint 10 also includes a metal gasket sheet 24. Metal gasket sheet 24 is located between first sealing surface 14 and second sealing surface 20. Metal gasket sheet 24 has an upper surface 26, lower surface 28 and an aperture 30. As may be seen from the illustration of FIG. 1, the first opening 16 and second opening 22 are mating openings, that is, they are adapted for cooperation with one another such that when they are joined together in seal joint 10 they define a fluid passageway. Aperture 30 corresponds with the mating openings and cooperates together with them to define a fluid passageway. Aperture 30 has a perimeter 32. Perimeter 32 may comprise any necessary shape. In the case where metal gasket sheet 24 is a cylinder head gasket, perimeter 32 may have a cylindrical shape. In the case where gasket 24 is a gasket seal for a turbo charger, perimeter 32 may be generally rectangular or square, typically with rounded corners such as shown in FIG. 2. Perimeter 32 may be of any desired shape. Preferably, aperture 30 and perimeter 32 will correspond to the shape of first opening 16 and second opening 22.

Figure 8:
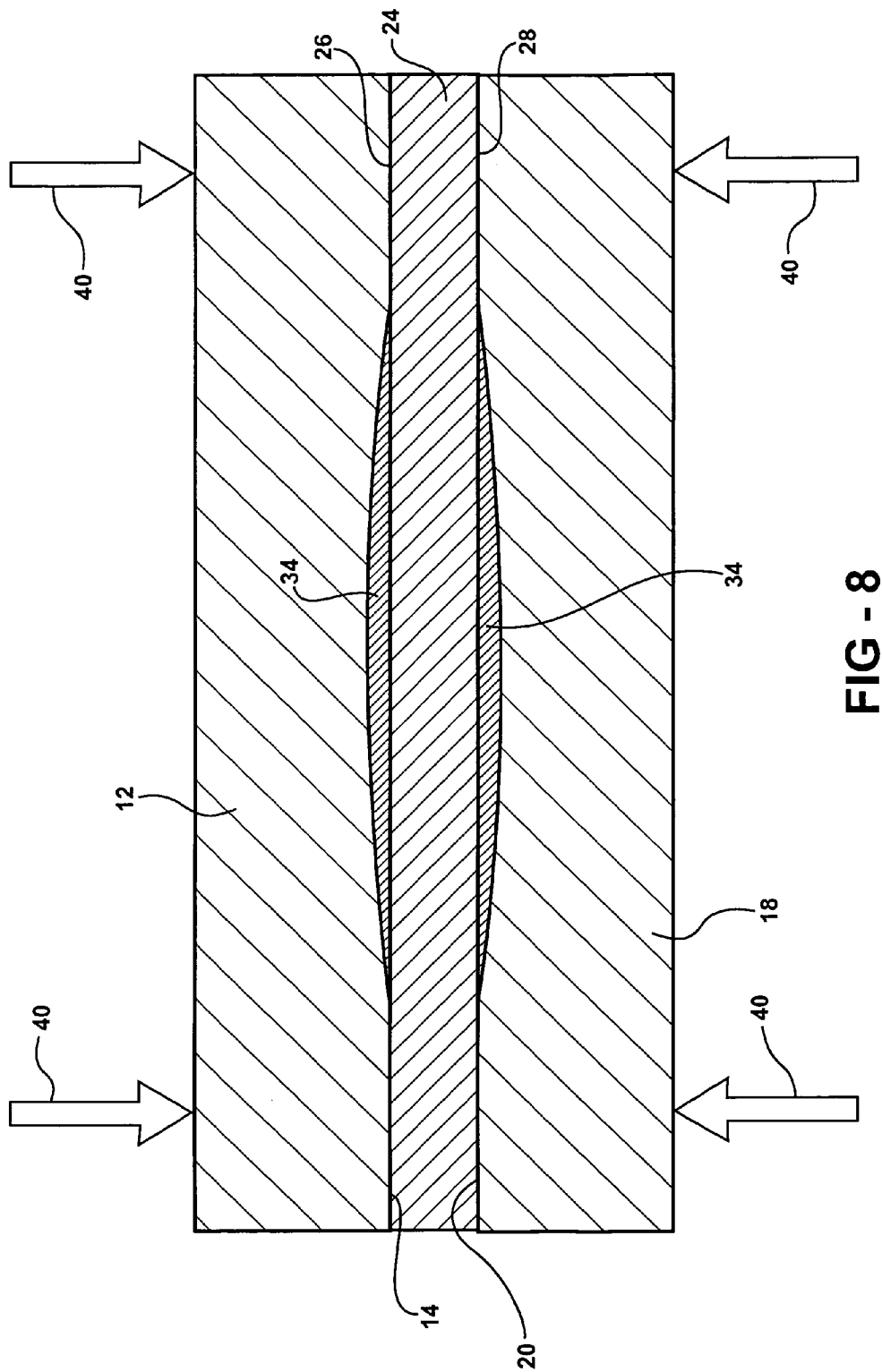
FIG. 8 is a cross-sectional view of an alternate embodiment of a gasket and seal joint of the invention.
Figure 9:
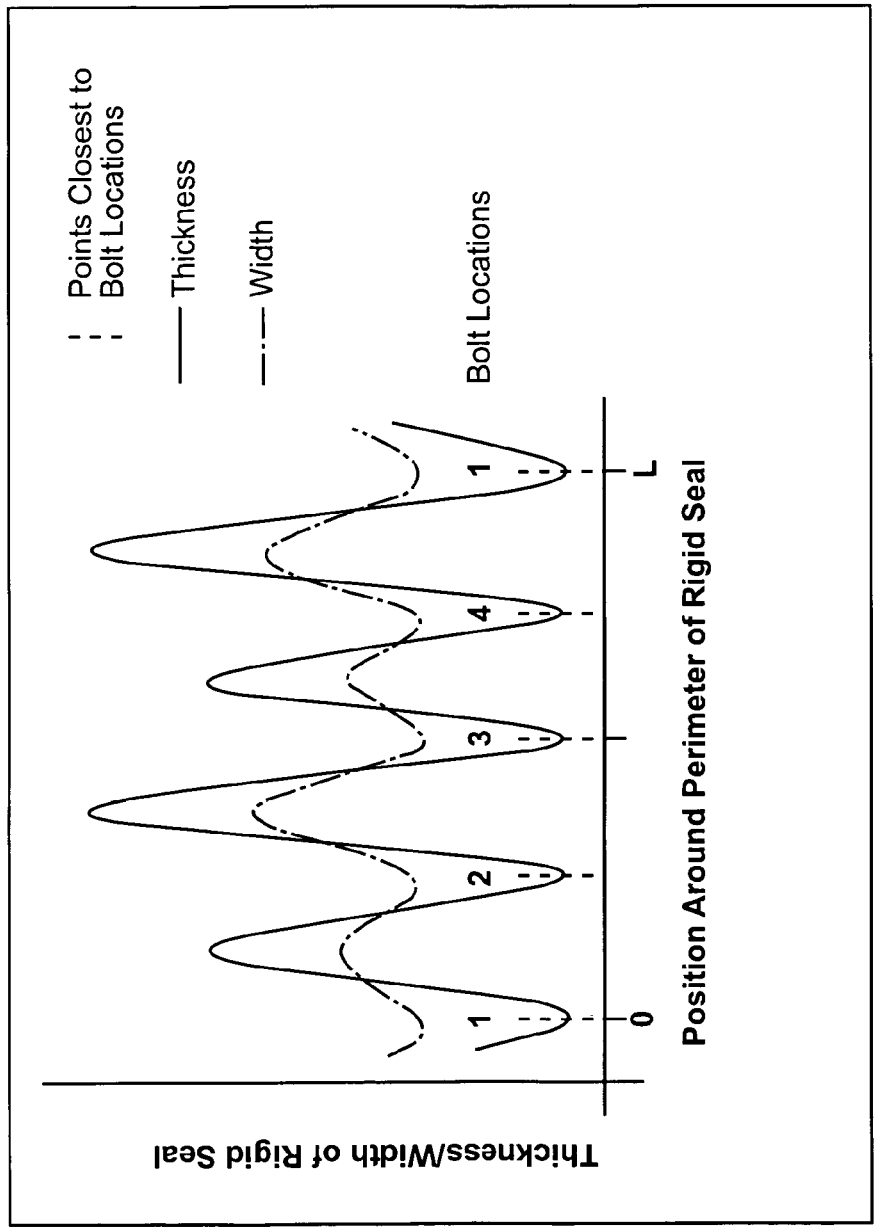
FIG. 9 is a plot of thickness/width of a rigid seal as a function of position along the length of the rigid seal.

Metal gasket sheet 24 also includes protruding rigid seal 34 which surrounds perimeter 32 of aperture 30 and which is attached to at least one of upper surface 26 and lower surface 28. In the embodiment illustrated in FIGS. 2-6, rigid seal 34 is attached to upper surface 26. However, rigid seal 34 may also be attached to lower surface 28. Still further, in an alternate embodiment, rigid seal 34 may also be attached to both upper surface 26 and lower surface 28, as is generally illustrated in FIG. 8. Rigid seal 34 has a thickness 36 by which it protrudes from the surface to which it is attached and a width 38 that vary as a function of position along the length (L) of rigid seal 34 (see FIGS. 4-6). The variation of thickness 36 and width 38 as a function of position along the length of perimeter 32 is illustrated by the plot of FIG. 9. While reference is made herein to variation of thickness 36 and width 38 with respect to position along the length of rigid seal, it will be recognized that this variation may be referenced also to position along the perimeter 32, or other convenient means of reference, such as a radial or polar reference using the center of aperture 30 as the origin.

Figure 7:
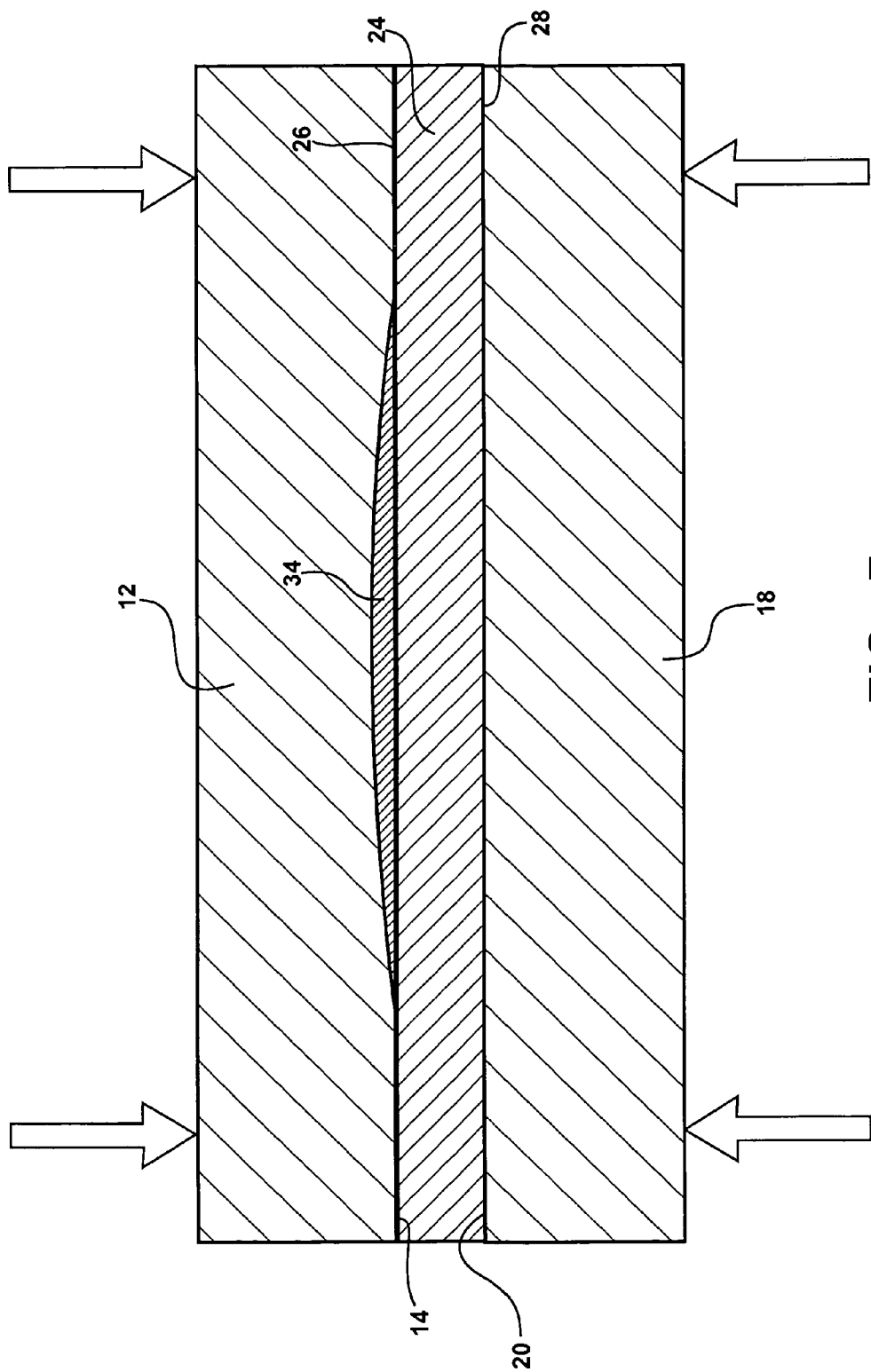
FIG. 7 is a partial cross-sectional view of the gasket of FIG. 2 which also includes for the purpose of illustration of a seal joint of the invention.

Seal joint 10 also includes a means for applying a sealing force 40 to press together first sealing surface 14, metal gasket sheet 24 and second sealing surface 20 so as to form a seal joint 10 between them. The means for applying the sealing force 40 causes elastic deformation of at least one of first sealing surface 14 and second sealing surface 20 by rigid seal 34. As best shown in FIG. 7, in the exemplary embodiment of the invention, the surface 14 is elastically deformed in a concave configuration around the rigid seal 34 whereby portions of the sealing surface 14 on opposite sides of the rigid seal 14 contact the metal gasket sheet 24. This feature is an important aspect and advantage of the present invention. The elastic deformation of at least one of first sealing surface 14 and second sealing surface 20 by rigid seal 34 is significantly different than sealing using multilayer metal gaskets, either with or without distance or stopper layers. Multilayer metal gaskets provide sealing based on deformation of the sealing features, such as sealing beads, of the gasket material. In contrast, the present invention promotes sealing by elastic deformation of at least one of the first sealing surface 14 and second sealing surface 20 by rigid seal 34. This is an important distinction because the section thicknesses of first member 12 and second member 18 which are associated with first sealing surface 14 and second sealing surface 20 are typically much larger than the thicknesses of the layers of a conventional multilayer metal gasket. As such, the stress and strain levels and distribution within first member 12 and second member 18 may be established so that they are not of magnitude or concentration sufficient to cause fatigue cracking in these members during the operation of the device associated with seal joint 10. Further, the combination of first member 12, metal gasket 24, rigid seal 34 and second member 18 provides a significantly stiffer seal joint 10 than seal joints which utilize multilayer metal gaskets. The fact that seal joint 10 is less compliant than seal joints which incorporate multilayer metal gaskets is also expected to improve the performance of seal joint 10 with respect to issues such as joint distortion, as has been described above with respect to seal joints which seal the combustion cylinder in cylinder head gasket applications. Means for applying a sealing force 40 preferably comprises at least one, and more preferably a plurality of, fasteners 42. When means for applying sealing force 40 comprises fasteners 42, fasteners 42 are preferably threaded bolts which are adapted to be passed through bolt hole opening in one of first member 12 or second member 18. Sealing force is generated by tightening the threaded bolt into a threaded bore or by attachment of a corresponding threaded backing nut to draw first member 12, metal gasket sheet 24, rigid seal 34 and second member into touching contact with one another with sufficient sealing force to provide seal joint 10, thereby sealing the fluid passageway and preventing the escape of a fluid when the apparatus incorporating seal joint 10 is used and a fluid is flowing with the passageway, such as, for example, in the sealing of combustion gases by the seal joint associated with a combustion cylinder of an internal combustion engine. Other well known fasteners 42 such as threaded screws or fasteners which utilize cam surfaces may also be used as means for applying sealing force 40.

Metal gasket sheet 24 may be made from any suitable metal depending upon the particular application environment in which it is to be utilized. However, in many extreme environments, such as many internal combustion engine applications, metal gasket sheet 24 may be made from stainless steel, such as type 301 stainless steel. Metal gasket sheet 24 may be of any suitable shape depending on the application, and may incorporate a single aperture 30 or a plurality of apertures 30. In the case where metal gasket sheet 24 incorporates a plurality of apertures 30, apertures may be of the same shape and size or different shapes and sizes. Metal gasket sheet 24 may be of any suitable thickness depending on the application, in internal combustion engine applications, the thickness of metal gasket sheet 24 is generally in the range of 0.008-0.10 inches.

Rigid seal 34 may be made from any suitably rigid material including metals, composite materials and organic or inorganic polymers. It is believed to be preferred that rigid seal 34 also comprise a metal. By rigid, it is meant that the thickness, width and material selected for the seal provide less compliance, preferably significantly less compliance, than the portions of first sealing surface 14 and second sealing surface proximate rigid seal 34, such that when means for applying clamping force 40 is applied, most of the elastic deformation occurs within one of both of these surfaces rather than within rigid seal 34. Thus, the material and design of rigid seal 34 will be selected so as to satisfy this requirement in view of the materials and designs of first member 12 and its first sealing surface 14 and second member 18 and its second sealing surface 20. Where rigid seal 34 is a metal, the metal of rigid seal 34 may be the same as the metal of metal gasket sheet 24 or a different metal. For example, in internal combustion engine applications, rigid seal 34 may be a stainless steel, such as type 301 stainless steel.

Rigid seal 34 is attached to metal gasket sheet 24. As used herein, attached also includes configurations where rigid seal 34 is formed integrally with or from metal gasket sheet 24. An example of a method which may be utilized for forming rigid seal 34 integrally with metal gasket sheet 24 may be found in commonly assigned U.S. patent application Ser. No. 10/004,071 filed on Oct. 25, 2001, which is hereby incorporated herein by reference in its entirety. Rigid seal 34 may also be formed separately from metal gasket sheet 24 and attached to metal gasket sheet 24. In the case where rigid seal 34 comprises a composite or polymer, the use of adhesives may be employed to attach rigid seal 34 to metal gasket sheet 24. Alternately, rigid seal 34 may be molded onto metal gasket sheet 34. Where rigid seal 34 is a metal, any suitable means of a method of attaching rigid seal 34 to metal gasket sheet 24 may be employed, such as welding, ultrasonic bonding, staking, brazing, flame spraying, electroplating, laser deposition, screen printing and sintering, casting or other methods of attaching rigid seal 34 to the surface of metal gasket sheet 24. Rigid seal 34 may be attached with a finished contour of a variable width and thickness as described above, or may be attached as a layer of uniform thickness and subsequently processed to form the desired thickness/width contour profile. For example, a rigid seal having a uniform thickness and/or width may be attached to metal gasket sheet 24 and machined to produce the desired variable thickness and width contour profile. In the case where rigid seal 34 is attached to the surface of metal gasket sheet 24 as a seal having a uniform thickness and/or width, the contour profile of thickness can be formed by a process of electrochemical machining (ECM) according to a method described in commonly assigned, co-pending U.S. Provisional Patent Application Ser. No. 60/611,786 filed on Sep. 21, 2004, which is hereby incorporated by reference herein in its entirety.

Rigid seal 34 may be located with respect to perimeter 32 in any desired configuration or arrangement. For example, rigid seal 34 may be located directly adjacent to perimeter 32, or may be spaced inwardly from perimeter 32 as illustrated in the embodiment shown in FIGS. 2 and 3, or may be partly adjacent to perimeter 32 and partly inwardly spaced from perimeter 32. As a result, in the exemplary embodiment of the invention, the elastic deformation of the sealing surface 14 is maximized at a position spaced inwardly away from the perimeter 32 of the aperture 30.

As described above, the thickness 36 and width 38 contour profiles of rigid seal 34 vary as a function of position along the length of rigid seal 34. In the exemplary embodiment of the invention, the elastic deformation of the sealing surface 14 is maximized at a position between two of the fasteners 42 because the thickness of the rigid seal 34 is maximized at a position between two of the fasteners 42. Also, in the exemplary embodiment of the invention, the elastic deformation of the sealing surface 14 is maximized at a position between two of the fasteners 42 because the width of the rigid seal 34 is maximized at a position between two of the fasteners 42. The ranges of thicknesses and widths and their variable profiles will vary according to the sealing applications and characteristics of seal joints 10. For example, in a turbocharger seal application, the thickness varied over the range of about 0-0.005 inches and width varied over the range of about 0.020-0.120 inches. It is preferred that the thickness of rigid seal 34 is generally greater in portions of rigid seal 34 which are farther from a fastener 42 and generally lesser in portions of rigid seal 34 which are closer to a fastener 42, as illustrated in FIG. 9. Likewise, it is preferred that the width 38 of rigid seal 34 is generally greater in portions of rigid seal 34 which are farther from a fastener 42 and is generally lesser in portions of rigid seal 34 which are closer to a fastener 42. The contour profile of thickness and width may vary according to any predetermined profile. However, it is generally preferred that the profile be selected to control the sealing force along the length of rigid seal 34 in response to application of a predetermined means for providing a sealing force 40. It is further preferred to provide such control so as to make the sealing force or pressure along the length of rigid seal 34 uniform. Computer aided design and modeling may be utilized to determine a contour profile that provides a uniform sealing pressure along rigid seal 34 utilizing known techniques and methods.

What is claimed is:

1. A seal joint, comprising:
   a first member having a first sealing surface and a first opening therein;
   a second member having a second sealing surface and a second opening therein, the first opening and the second opening comprising mating openings;
   a metal gasket sheet located between the first sealing surface and the second sealing surface having an upper surface, a lower surface, and an aperture through said sheet which corresponds to the mating openings, the aperture having a perimeter;
   a rigid seal which surrounds the perimeter of the aperture and which is attached to at least one of the upper surface and lower surface, said rigid seal having a thickness and a width which vary as a function of position along a length of said rigid seal; and
   said metal gasket sheet being free of elastic bead formations surrounding said aperture, and at least one of said first and second sealing surfaces being deformed about said rigid seal so as to sealing contact both said rigid seal and said metal gasket sheet laterally adjacent said rigid seal along a nonlinear deformed region of said at least one of said first and second sealing surfaces.

2. The seal joint of claim 1, wherein said metal gasket sheet and said rigid seal are formed from a single metal blank.

3. The seal joint of claim 1, wherein said rigid seal is formed separately from a metal and attached to said gasket sheet, and wherein said rigid seal and said metal gasket sheet comprise the same metal.

4. The seal joint of claim 1, wherein said rigid seal is formed separately from a metal and attached to said gasket sheet, and wherein said rigid seal and said metal gasket sheet comprise different metals.

5. The seal joint of claim 1, wherein said rigid seal is spaced inwardly away from the perimeter of the aperture whereby said elastic deformation of said at least one of the first sealing surface or the second sealing surface is maximized at a position spaced inwardly away from the perimeter of the aperture.

6. The seal joint of claim 1, including a plurality of fasteners which are adapted to fasten one of said first member and said second member to the other of said first member and said second member.

7. The seal joint of claim 6, wherein the thickness of said rigid seal is generally greater in portions of said seal which are farther from the fastener and is generally lesser in portions of said rigid seal which are closer to the fastener whereby said elastic deformation of said at least one of the first sealing surface or the second sealing surface is maximized at a position between two of said plurality of fasteners.

8. The seal joint of claim 6, wherein the width of said rigid seal is generally greater in portions of said seal which are farther from the fastener and is generally lesser in portions of said rigid seal which are closer to the fastener whereby said elastic deformation of said at least one of the first sealing surface or the second sealing surface is maximized at a position between two of said plurality of fasteners.

* * * * *